US009213775B2

(12) United States Patent
Tseng (10) Patent No.: US 9,213,775 B2
(45) Date of Patent: Dec. 15, 2015

(54) DOMAIN-SPECIFIC BROWSER TAB CREATION AND MANAGEMENT

(75) Inventor: Erick Tseng, San Francisco, CA (US)

(73) Assignee: Facebook. Inc., Menlo Park, CA (US)

(*) Notice: Subject to any disclaimer, the term of this patent is extended or adjusted under 35 U.S.C. 154(b) by 416 days.

(21) Appl. No.: 13/224,153

(22) Filed: Sep. 1, 2011

(65) Prior Publication Data
US 2013/0061160 A1    Mar. 7, 2013

(51) Int. Cl.
*G06F 3/048*    (2013.01)
*G06F 17/30*    (2006.01)
*G06F 3/0483*    (2013.01)

(52) U.S. Cl.
CPC ........ *G06F 17/30884* (2013.01); *G06F 3/0483* (2013.01); *G06F 17/30905* (2013.01)

(58) Field of Classification Search
CPC ................... G06F 17/30861–17/30997; G06F 3/048–3/04886; G06F 17/30011; G06F 17/30058–17/30064; G06F 17/30587–17/30604
USPC ........................... 707/600–899; 715/200–867
See application file for complete search history.

(56) References Cited

U.S. PATENT DOCUMENTS

| | | | |
|---|---|---|---|
| 6,049,812 A | 4/2000 | Bertram | |
| 2002/0116528 A1* | 8/2002 | Vale ...................... | G06F 3/0236 709/245 |
| 2005/0015726 A1 | 1/2005 | Tuominen | |
| 2005/0131992 A1* | 6/2005 | Goldstein et al. ............. | 709/202 |
| 2006/0184875 A1* | 8/2006 | Okada et al. .................. | 715/516 |
| 2006/0206834 A1* | 9/2006 | Fisher et al. .................. | 715/777 |
| 2006/0218500 A1* | 9/2006 | Sauve .................. | G06F 9/4443 715/767 |
| 2006/0230356 A1* | 10/2006 | Sauve et al. .................... | 715/777 |
| 2007/0016543 A1* | 1/2007 | Epling et al. ..................... | 707/1 |

(Continued)

OTHER PUBLICATIONS

Melman, H. (2009). Quicksilver User Manual. Published Jan. 10, 2009, retrieved from Dec. 18, 2012 from mysite.verizon.net/hmelman/Quicksilver.pdf.*

(Continued)

*Primary Examiner* — Andrea Long
*Assistant Examiner* — Linda Huynh
(74) *Attorney, Agent, or Firm* — Baker Botts L.L.P.

(57) ABSTRACT

Methods and systems directed to a web browser application that efficiently manages tab creation and switching. The application creates a new browser tab for each top-level domain visited, and stores the data structure for the tab, including forward and backward history, in a table. The application also creates a new browser tab in response to a separate application invoking a web browser, or in response to an explicit command by a user to create a browser tab. Thus, a user may efficiently switch between multiple browser tabs without having to expend time and energy in managing, opening, or closing browser tabs.

18 Claims, 11 Drawing Sheets

(56) References Cited

U.S. PATENT DOCUMENTS

| | | | |
|---|---|---|---|
| 2007/0067733 A1* | 3/2007 | Moore | G06F 17/30899 715/777 |
| 2007/0106953 A1* | 5/2007 | Forstall | G06F 17/30884 715/779 |
| 2008/0301562 A1* | 12/2008 | Berger et al. | 715/733 |
| 2009/0150810 A1* | 6/2009 | Burroughs | G06F 17/30873 715/764 |
| 2009/0164887 A1* | 6/2009 | Ikegami | 715/247 |
| 2009/0241032 A1 | 9/2009 | Challener et al. | |
| 2009/0293018 A1* | 11/2009 | Wilson et al. | 715/811 |
| 2009/0327947 A1* | 12/2009 | Schreiner | G06F 3/0483 715/777 |
| 2010/0011313 A1* | 1/2010 | Sauve | G06F 3/0481 715/777 |
| 2010/0017696 A1* | 1/2010 | Choudhary | G06F 17/30902 715/205 |
| 2010/0070928 A1* | 3/2010 | Goodger | G06F 17/30905 715/838 |
| 2010/0095219 A1* | 4/2010 | Stachowiak et al. | 715/745 |
| 2010/0115451 A1* | 5/2010 | Moore et al. | 715/777 |
| 2011/0071996 A1 | 3/2011 | Fisher | |
| 2011/0072387 A1* | 3/2011 | Fisher et al. | 715/777 |
| 2011/0252342 A1* | 10/2011 | Broman | G06F 17/30899 715/760 |

OTHER PUBLICATIONS

Wong, S. Y. (2009). How to Remove New Tab Button in Firefox 3.5. MyDigitalLife.com. Published Jul. 29, 2009, retrieved Dec. 21, 2012 from http://www.mydigitallife.info/how-to-remove-new-tab-button-in-firefox-3-5/.*

Melman, H. (2009). Quicksilver User Manual. Published Jan. 10, 2009, retrieved from Dec. 18, 2012 from mysite.verizon, net/hmelman/Quicksilver.pdf.*

Zibreg, C. (2010). Hands on Firefox 4 beta. Geek.com. Published Jul. 7, 2010, retrieved Dec. 20, 2012 from http://www.geek.com/articles/chips/hands-on-firefox-4-beta-2010077/.*

International Search Report and Written Opinion for International Application PCT/US2012/051022, Feb. 19, 2013.

* cited by examiner

| last visit date | URL | last visit screenshot | tab history | form data / cookies |
|---|---|---|---|---|
| 13:54 8/25/11 | www.facebook.com | 8_25_13.54.jpg | /profile?id=... /phonebook | 8_25_13.54.txt |
| 13:30 8/25/11 | www.yelp.com | 8_25_13.30.jpg | /review?id=... /map?id=... | 8_25_13.30.txt |
| 13:01 8/25/11 | www.nytimes.com | 8_25_13.01.jpg | /article?id= ... | 8_25_13.01.txt |
| 13:00 8/25/11 | http://www.nytimes.com/2011/08/25/world/africa/25libya.htm | 8_25_13.00.jpg | /world/asia/... | - |
| 13:00 8/25/11 | http://www.nytimes.com/2011/08/24/opinion/a-pledge-to-end-fraternity-hazing.html | 8_25_13.00a.jpg | - | - |

DOMAIN-SPECIFIC BROWSER TAB CREATION AND MANAGEMENT

TECHNICAL FIELD

The present disclosure relates generally to the management of virtual tabs in a web browser.

BACKGROUND

Conventional web browsers utilize multiple tabs, each with a separate HTTP connection to a web resource. The introduction of browser tabs greatly enhanced the convenience of web browsing; however, browser tab management, particularly on mobile devices, continues to be time consuming and an arduous task.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a browser that stores a separate tab, including the history, screenshot of the last visited URL, and cookie data for each set of visited addresses having the same top-level domain. Implementations of the present invention extend these concepts by permitting a user to store and access a nearly infinite number of tabs, while shielding the user from the arduous task of tab management.

In particular embodiments, a streamlined user interface permits a user to view a sorted list of history, bookmarks, frequency sorted history, or open tabs in a list or tiled graphical representation. Thus the application provides the user a convenient means of accessing a plurality of stored tabs while obviating the need for the user to manually manage tabs.

Figure 1:
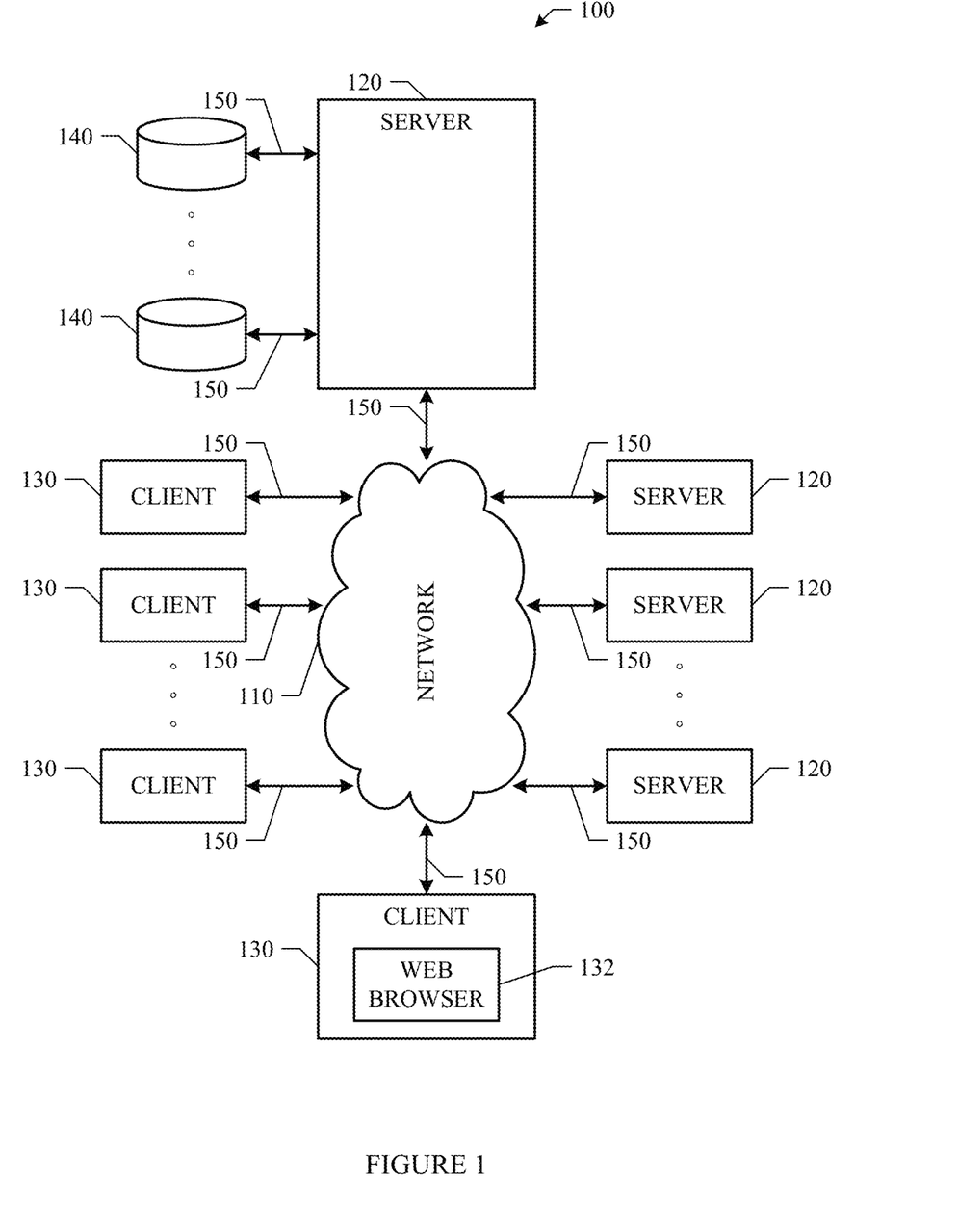
FIG. 1 illustrates an example network environment

FIG. 1 illustrates, for didactic purposes, an example network environment 100. Network environment 100 includes a network 110 coupling one or more servers 120 and one or more clients 130 to each other. Network environment 100 also includes one or more data storage 140 linked to one or more servers 120. Particular embodiments may be implemented in network environment 100. For example, social networking system frontend 120 may be written in software programs hosted by one or more servers 120. For example, event database 102 may be stored in one or more storage 140. In particular embodiments, network 110 is an intranet, an extranet, a virtual private network (VPN), a local area network (LAN), a wireless LAN (WLAN), a wide area network (WAN), a metropolitan area network (MAN), a portion of the Internet, or another network 110 or a combination of two or more such networks 110. The present disclosure contemplates any suitable network 110.

One or more links 150 couple a server 120 or a client 130 to network 110. In particular embodiments, one or more links 150 each includes one or more wired, wireless, or optical links 150. In particular embodiments, one or more links 150 each includes an intranet, an extranet, a VPN, a LAN, a WLAN, a WAN, a MAN, a portion of the Internet, or another link 150 or a combination of two or more such links 150. The present disclosure contemplates any suitable links 150 coupling servers 120 and clients 130 to network 110.

In particular embodiments, each server 120 may be a unitary server or may be a distributed server spanning multiple computers or multiple datacenters. Servers 120 may be of various types, such as, for example and without limitation, web server, news server, mail server, message server, advertising server, file server, application server, exchange server, database server, or proxy server. In particular embodiments, each server 120 may include hardware, software, or embedded logic components or a combination of two or more such components for carrying out the appropriate functionalities implemented or supported by server 120. For example, a web server is generally capable of hosting websites containing web pages or particular elements of web pages. More specifically, a web server may host HTML files or other file types, or may dynamically create or constitute files upon a request, and communicate them to clients 130 in response to HTTP or other requests from clients 130. A mail server is generally capable of providing electronic mail services to various clients 130. A database server is generally capable of providing an interface for managing data stored in one or more data stores.

In particular embodiments, one or more data storages 140 may be communicatively linked to one or more servers 120 via one or more links 150. In particular embodiments, data storages 140 may be used to store various types of information. In particular embodiments, the information stored in data storages 140 may be organized according to specific data structures. In particular embodiment, each data storage 140 may be a relational database. Particular embodiments may provide interfaces that enable servers 120 or clients 130 to manage, e.g., retrieve, modify, add, or delete, the information stored in data storage 140.

In particular embodiments, each client 130 may be an electronic device including hardware, software, or embedded logic components or a combination of two or more such components and capable of carrying out the appropriate functions implemented or supported by client 130. For example and without limitation, a client 130 may be a desktop computer system, a notebook computer system, a netbook computer system, a handheld electronic device, or a mobile telephone. The present disclosure contemplates any suitable clients 130. A client 130 may enable a network user at client 130 to access network 130. A client 130 may enable its user to communicate with other users at other clients 130.

A client 130 may have a web browser 132, such as Microsoft Internet Explorer, Google Chrome, Apple Safari, Opera, Chromium-based browsers, or Mozilla Firefox. Additionally client 130 may be a mobile device having a specialized mobile-optimized web browser, such as the iOS browser, Android browser, Opera Mini, Blackberry browser, Firefox for Android, Skyfire, etc. Regardless of whether client 130 runs a traditional web browser or a mobile-optimized version, browsers may have one or more add-ons, plug-ins, or other extensions, such as Google toolbar or Yahoo! Toolbar. A user at client 130 may enter a Uniform Resource Locator (URL) or other address directing the web browser 132 to a server 120, and the web browser 132 may generate a Hyper Text Transfer Protocol (HTTP) request and communicate the HTTP request to server 120. Server 120 may accept the HTTP request and communicate to client 130 one or more Hyper Text Markup Language (HTML) files responsive to the HTTP request. Client 130 may render a web page based on the HTML files from server 120 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 2A:
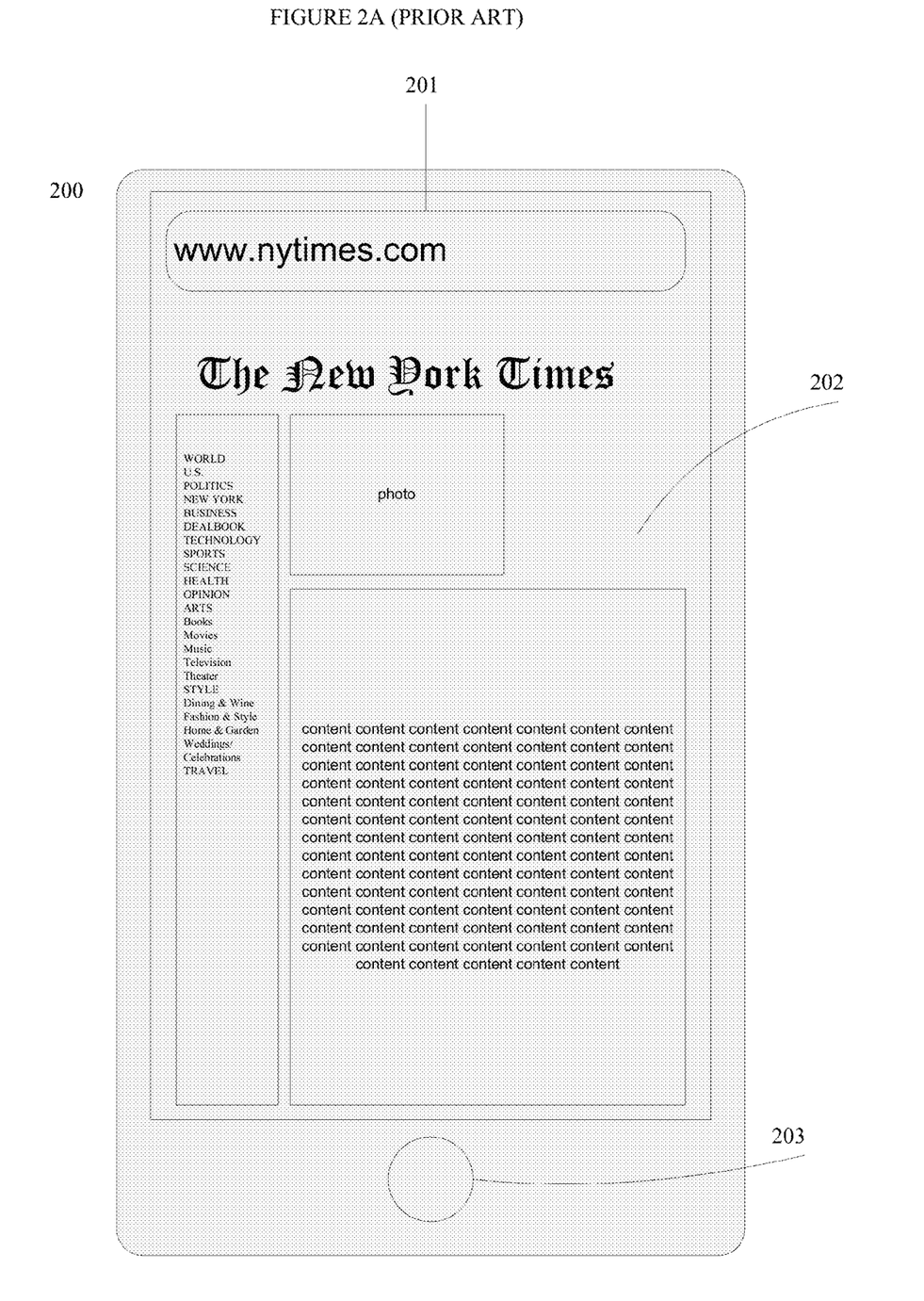
FIGS. 2A-2C illustrate an example prior art mobile web browser.
Figure 2B:
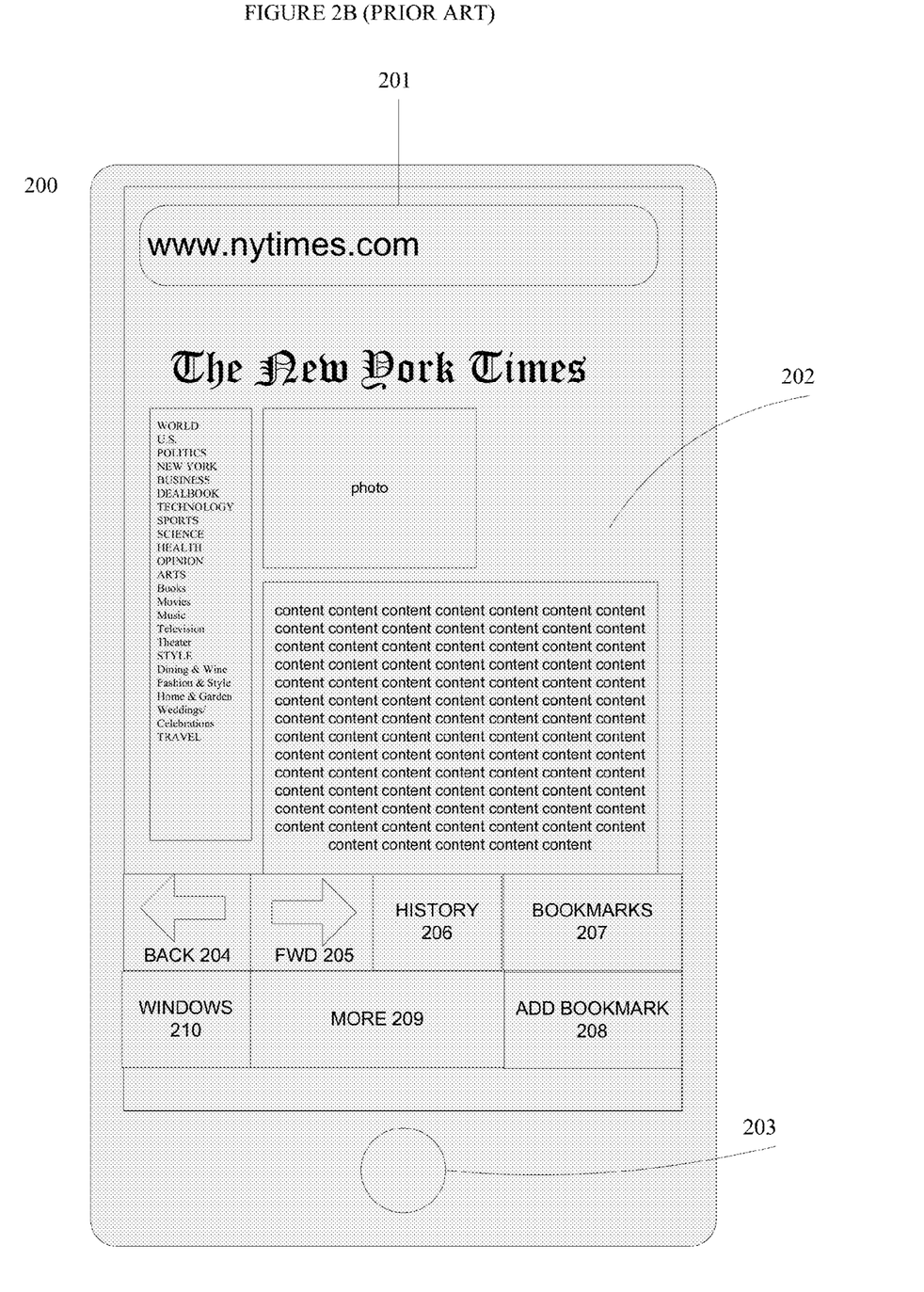
Figure 2C:
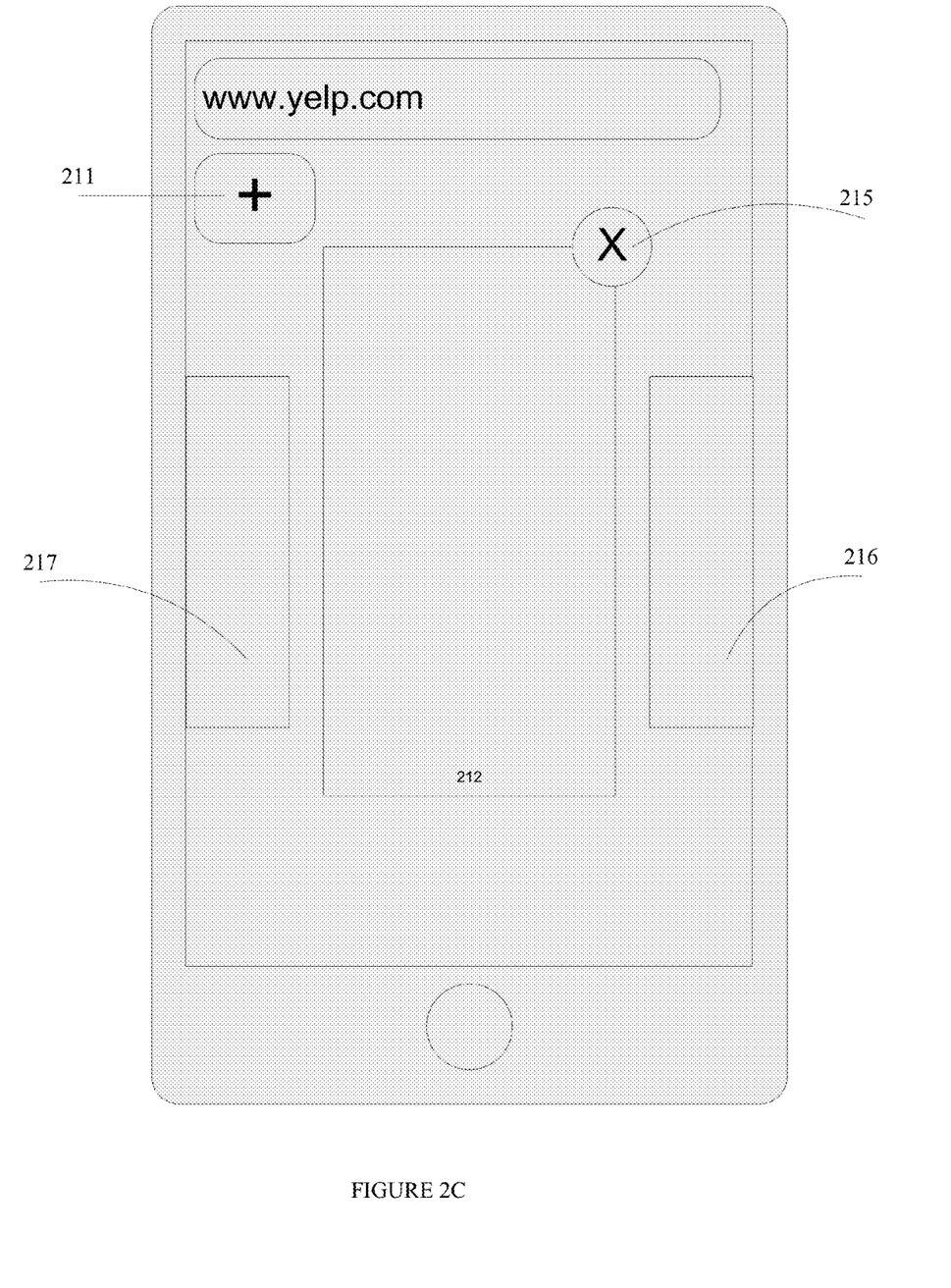

FIGS. 2A-2C illustrate an example mobile web browser 132 on mobile device 200 of the prior art. Mobile browsers pose special design challenges due to the extremely limited amount of screen real estate and, in some cases, processor and memory resources. FIG. 2A depicts an example mobile device 200 running a mobile web browser 132. Much like a standard web browser, mobile browser 132 contains an address bar 201, where a user may enter a URL to navigate to a new web address. Mobile browser 132's interface is designed to take up as little screen space as possible, so that more of website 202 may be visible on the limited display area. Consequently, accessing functions that are normally displayed on a toolbar of a standard web browser requires, at a minimum, a user selection of menu button 203.

FIG. 2B illustrates an example mobile web browser 132 after the user has selected "menu" button 203. Mobile web browser 132 then pops up a series of buttons that are selectable by the user, including, in particular embodiments, back button 204, forward button 205, history button 206, bookmarks button 207, window button 210, and add bookmark button 208. Because of the size of mobile device displays, in particular embodiments, all the buttons of mobile browser 132 cannot fit on a single pop-up menu and still be accurately and easily selected by the user. In such embodiments, one or more of buttons 204-208 and 210 may only be accessible after the user selects "more" button 209. Thus, in prior art mobile web browsers, merely accessing a list of open browser tabs, history, or bookmarks takes a minimum of one user selection, and in many cases requires two user selections. For the purposes of this application, a touchscreen selection method is described, however, the selection method may be through a trackball, stylus, trackpad, or any other suitable selection means.

FIG. 2C depicts, for didactic purposes, an example displayed output of mobile browser 132 after the user selects windows button 210. In particular embodiments, users may open multiple instances of their web browser, alternatively referred to as "windows" or "tabs." In some implementations, each browser tab or window is a separate process thread. In particular implementations, each browser tab maintains a separate HTTP connection to the URL of each tab. In the example of FIG. 2C, the user has three open tabs, 217 (displaying a page on the Yelp! domain), 212 (displaying a page on the New York Times domain as shown in FIG. 2B), and 216 (showing a page on the facebook domain). The user must, using a touch interface or other pointing device, scroll through all his or her open tabs to select a tab to switch to. Because managing a large number of tabs is generally confusing and time consuming, mobile web browser 132 often limit the user to a maximum number of tabs, for example, iOS's default browser only permits 8 open tabs. In particular implementations, this may be to conserve memory, processor, or bandwidth resources. In particular implementations, the maximum tab limit may be simply to prevent users who are unable to understand the concept of, or effectively use, "close tab/window" button 215, and end up with an unmanageable number of open tabs. Mobile web browser 132 also provides an "new tab/window" button 211 that allows a user to open a new browsing tab or window; the user may, upon opening a tab via "new tab" button 211, the user may manually enter an address or select a URL from his or her bookmarks or history. Therefore, the relatively simple process of switching between tabs, which may only take one selection or key press (for example CTRL-T in Mozilla Firefox) on a standard web browser, may take a large number of user selections. For example, merely switching from one tab to another requires, at a minimum, four user inputs (menu button 203, windows button 210, swiping to scroll to the selected tab, and selecting the actual tab). Multiple swiping motions may be required to scroll to the desired tab in window mode, as well. As another example, the relatively simple task of opening bookmark in a new tab requires, at a minimum, six user inputs (menu 203, windows 210, new tab 211, menu 203, bookmarks 207, and selecting the bookmark). If the user has a large number of bookmarks, additional user inputs may be necessary to scroll through the bookmarks. Thus, current tab management is inefficient with regard to both resources and time.

Browser Tab Management Architecture

Figure 3:
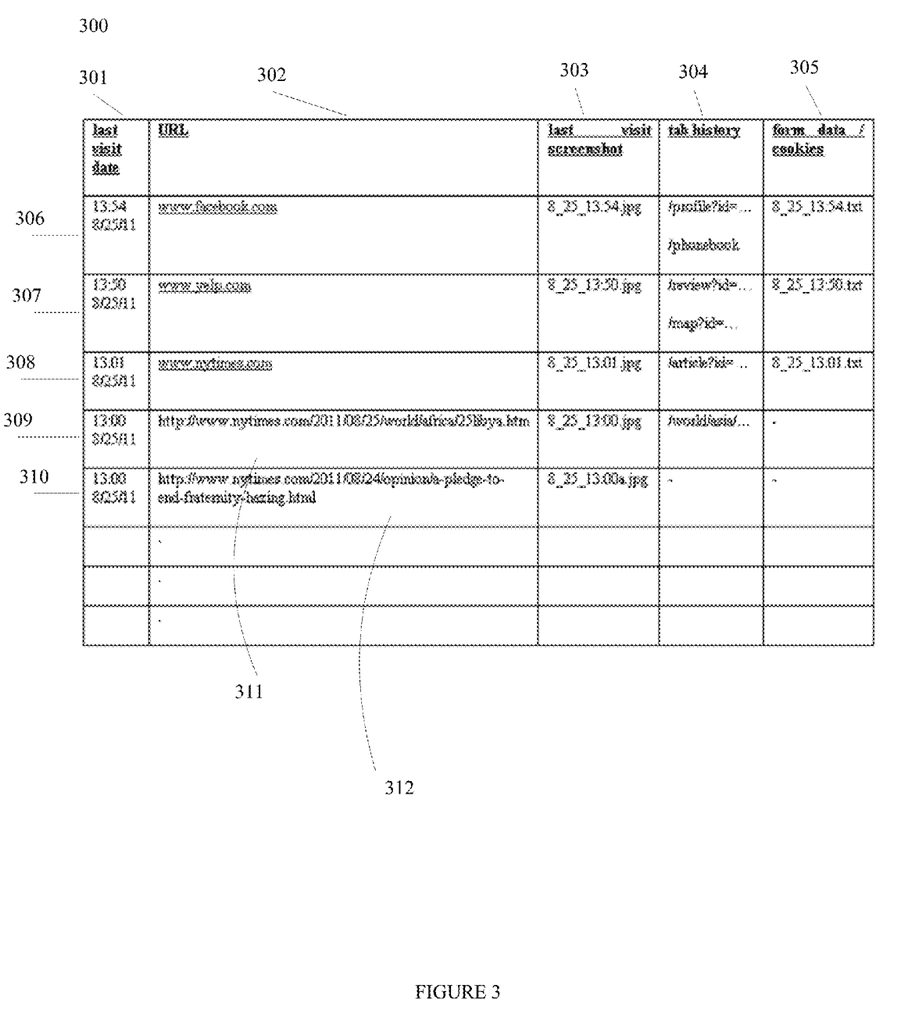
FIG. 3 illustrates an example table storing data structures representing browser tabs in accordance with one embodiment of the invention.

FIG. 3 depicts a data table storing state information for a plurality of open tabs. In particular embodiments, web browser 132 stores table 300 in local memory. In particular embodiments, the local memory is a temporary cache. Table 300 contains an entry for every visited domain visited within a predetermined amount of time, for example, 30 days. In particular embodiments, tabs may be removed from table 300 after their last visit exceeds the predetermined amount of time. In particular embodiments, tabs containing bookmarked pages are never removed from table 300 regardless of age, until the user deletes the bookmark. In particular embodiments, table 300 includes an entry for each top-level domain, such as all sites from the domain www.facebook.com, or www.yahoo.com. Although this application refers to each entry as a separate "tab", the tabs in the present invention differ from prior art browser tabs because they are, in particular embodiments, purely static; in such embodiments they neither consume bandwidth resources nor have their own process thread. The tabs of the present invention, stored as entries in table 300, contain, in particular embodiments, the time and date of the last visit 301, the top level domain URL 302, a small screenshot of the rendered web page at the time of the last visit 303, a full forward and backward history of the pages visited having the same top-level domain, and any form data or cookies stored in association with the visit to the domain. In particular embodiments, table 300 maintains a cache containing the content for each currently visited page for each tab. For example, tab 308 may have over 100 visited URLS in its history, but the most recently visited URL (which may still have a forward history, as it could have been reached by a user selecting the "back" option) may be cached in a data store so that the user may quickly recall and view it. In particular embodiments, the cache only caches text content in order to save space. In particular embodiments, the user may explicitly instruct browser 132 what content to cache, such as video. Thus, web browser 132 may, in particular embodiments, efficiently store a large number of visited pages that may be rapidly accessed by the browser.

In particular embodiments, the user may explicitly, or as a result of a predetermined policy, open a new tab for a page at the same domain. For example, table 300 contains 5 entries, tab 306 containing the history for all pages visited at the www.facebook.com domain, tab 307 containing the history for all pages visited at the www.yelp.com domain, and tab 308 containing the history for pages visited at the www.nytimes.com domain, with the exception of tabs 309 and 310. A user may decide he wishes to queue up several articles for later browsing, and explicitly open web pages 311 and 312 in new tabs 309 and 310, respectively. In particular embodiments, the content for the last visited page in these tabs is cached in a temporary browser cache for viewing offline, such as, for example, on a plane. In particular embodiments, web browser 132 creates a new tab entry in table 300 when navigation to the URL is invoked by another application. For example, if a user navigates to story 311 as a result of clicking a link in an email, browser 132 creates new tab entry 309 in table 300. In particular embodiments, the user may issue a command when selecting a link to open the link a new tab; in touchscreen phones it may be a tap and hold command. This disclosure contemplates any suitable manner of creating a new browser tab.

Figure 4:
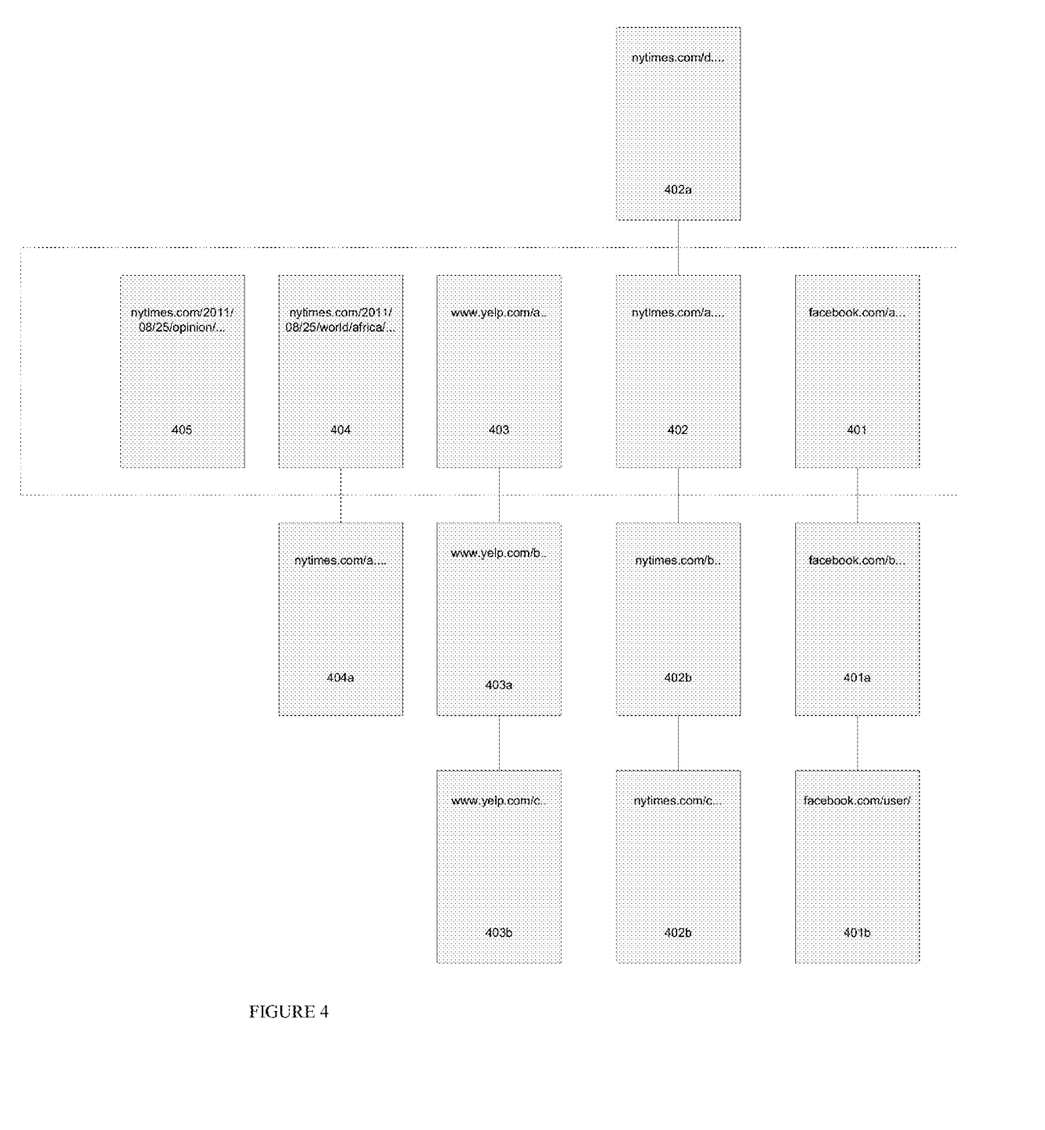
FIG. 4 illustrates an example browser tab structure in accordance with one embodiment of the invention.

FIG. 4 depicts the data of table 300 in a graphical representation analogous to the prior art tab view of FIG. 2C. Note that in the present invention, the tab structure and table 300 are completely hidden from the user, FIG. 4 is merely a different representation of FIG. 3 presented for didactic purposes.

Each entry in table 300 is represented as a column of web pages; for example, entry 306 of in table 300 corresponds to a tab comprising web pages 401, 401a, and 401b. Each of 401a and 401b are pages in the history column 304 for entry 306. The tabs 401, 402, 403, 404, and 405 correspond to the last visited page within the tab, or the current tab state. Tab 402 includes a web page 402a, indicating that tab 402 has one page in the forward history for the tab. As described with respect to table 300, each tab includes the forward and backward history for all visited pages having the same top-level domain. For example, tab 401 includes the history for all the visited pages on the facebook domain, and tab 402 includes the history for all the visited pages on the Yelp domain. Tabs 404 and 405 represent tabs that the user has created, either through an explicit command, or implicitly by visiting pages 404 and 405a by clicking on a non-browser link. Thus, if table 300 were displayed graphically on the display of FIG. 2C, a particular user could swipe left and right to scroll through all the most recently visited pages for each top-level domains within a particular time period, for example the past 30 days, and swipe up and down to visit a particular visited page in that top-level domain.

However, as previously discussed, in particular embodiments of the present invention, the tab structure of FIGS. 3 and 4 is completely hidden from the user, saving the user the arduous task of scrolling through potentially hundreds of tabs, through a browser tab management user interface, discussed in further detail below.

Browser Tab Management User Interface

Figure 5:
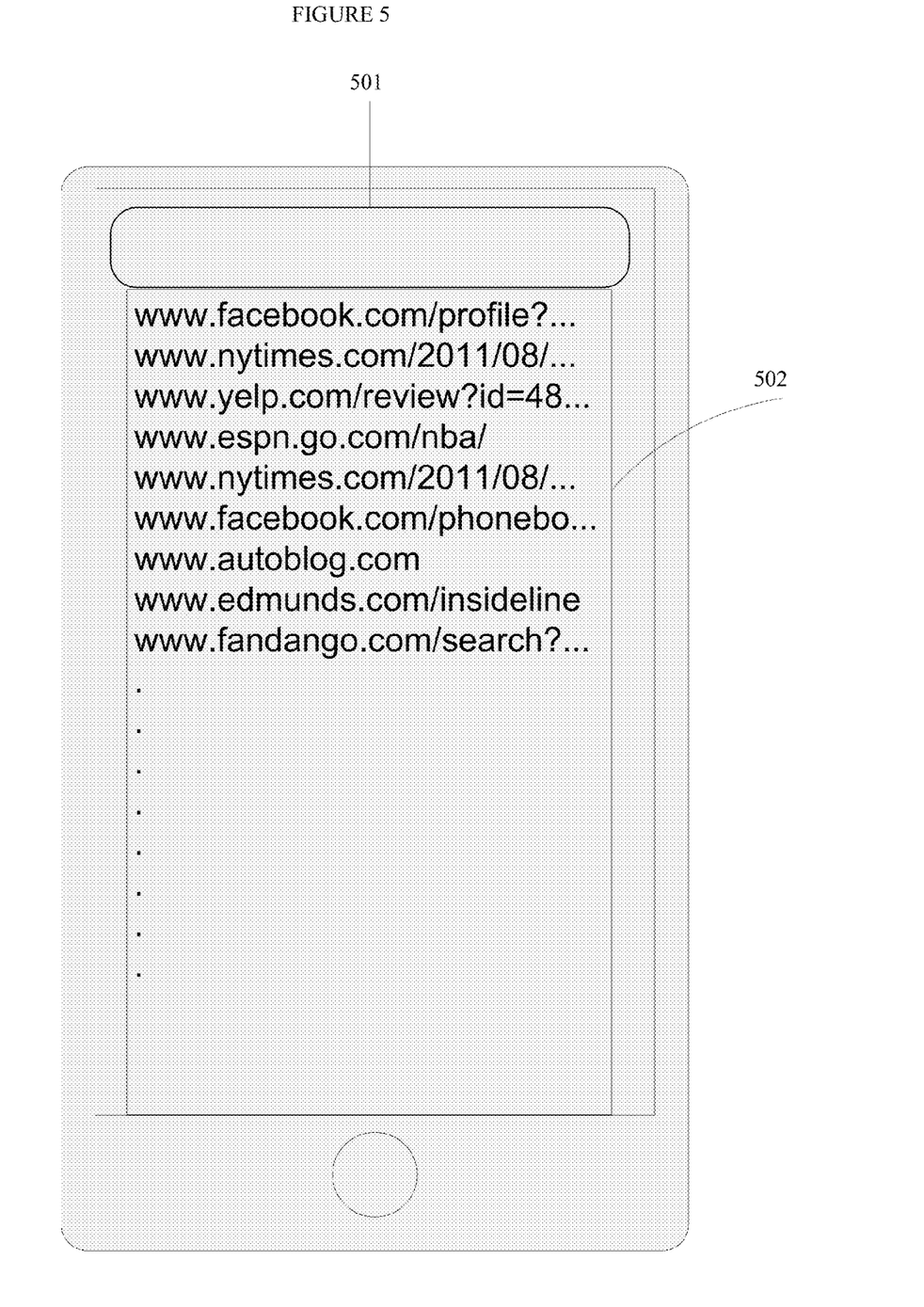
FIG. 5 illustrates one example embodiment of a simplified web browser interface.

FIG. 5 illustrates an example mobile web browser 132 display in accordance with one embodiment of the invention. Although the user interface of the present invention is described as used in conjunction with the browser tab structure as defined earlier, the user interface of FIGS. 5 and 6 may be utilized in any web browser, whether traditional or mobile. This disclosure contemplates any type of web browser and tab structure for use with the graphical user interface of FIGS. 5 and 6.

Web browser 132 of FIG. 5 includes an address bar 501. When a user selects the address bar 501, web browser 132 automatically displays and populates a list of addresses or URLS 502. In particular embodiments the list of URLs 502 may be a list of the user's bookmarks. In particular embodiments, the list of URLS 502 may be the user's browsing history, wherein the most recently visited addresses are displayed at the top of the list. In particular embodiments, the list of URLS 502 is frequency sorted, so that the most often visited URLs are displayed at the top of the list. In web browsers not utilizing the tab structure as described above, the list of URLs may be list of currently open tabs or windows. For example, applying the graphical user interface of FIGS. 5 and 6 to the traditional mobile browser of FIG. 2C, web browser 132 would populate the list of URLS 502 with the addresses of tabs 216, 217, and any other tabs that are currently open. In embodiments lacking the browser tab structure as described above, the list of URLs 502 may include, for each URL, a small button to open the selected URL in a new tab. This disclosure contemplates any suitable manner of selecting, sorting, and populating the list of URLs 502.

In particular embodiments, as the user begins typing into address bar 501, the list is filtered by the text strings entered in real-time. For example, as the user types "f", all the entries of list 502 except the "facebook" and "fandango" entries will be filtered from list 501. In particular embodiments, the search space is not merely list 501; for example, if list 501 comprises the user's bookmarks, the search space for filtering the list in response to entered strings may be the bookmarks and stored history of the browsing session. Methods of filtering lists are well known in the art, and this disclosure contemplates any suitable manner of filtering list 501 in response to user input.

Figure 6:
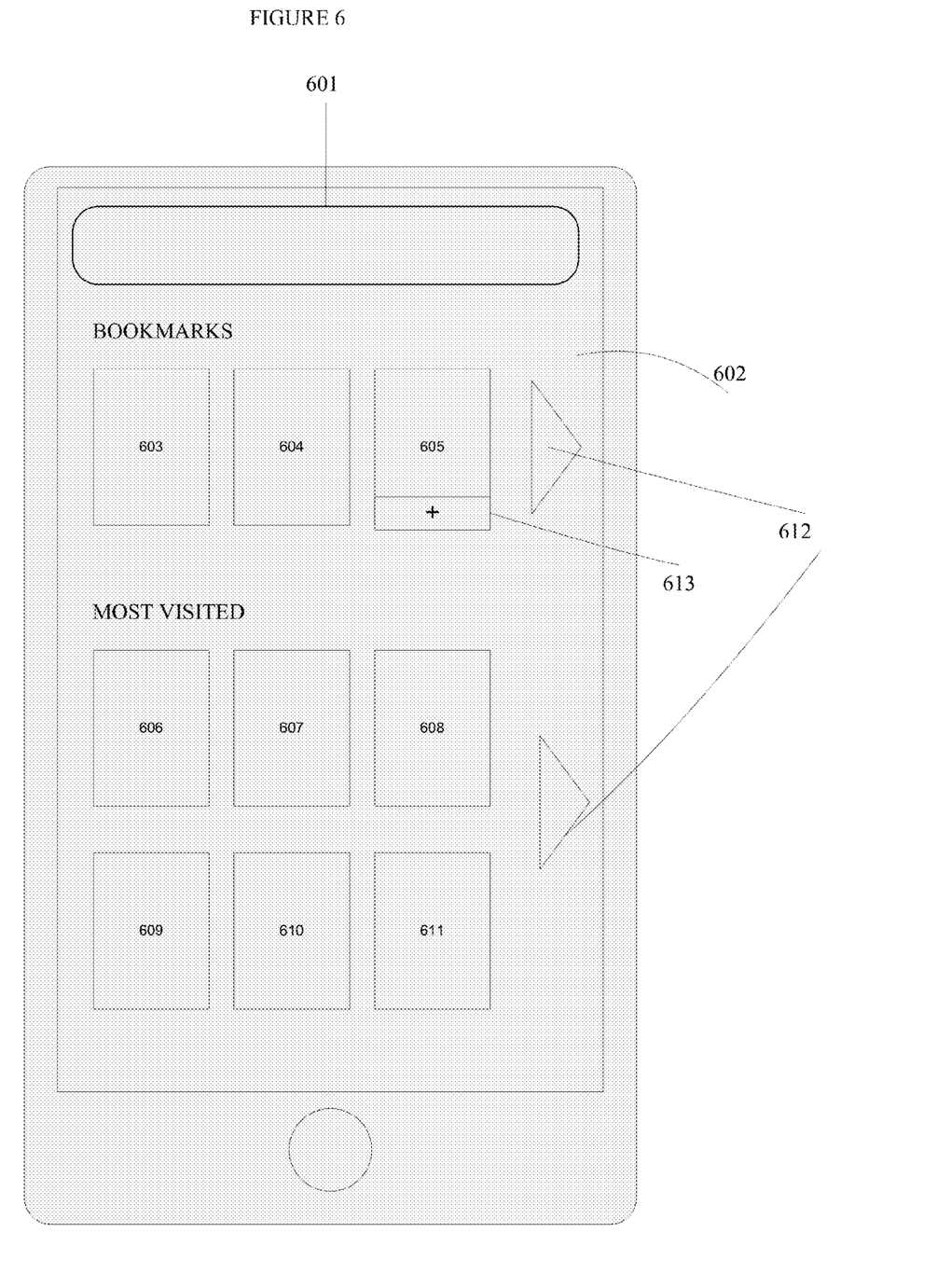
FIG. 6 illustrates one example embodiment of a simplified web browser interface.

FIG. 6 illustrates an alternative example display of a mobile web browser utilizing the graphical user interface of the present invention. Again, 601 includes an address bar as in FIGS. 5 and 2A-2C. In particular embodiments, upon selecting the address bar, web browser 132 displays on display 602 a set of thumbnail images 603-611. In particular embodiments, each thumbnail represents a web site, and each thumbnail is a screenshot of the last visit to the address. In particular embodiments, as in FIG. 6, the user interface is divided into two areas, one area for bookmarks, and one area for the most visited sites. In particular embodiments, thumbnail images 603-611 are the same thumbnails stored in association with each tab entry in table 300. In particular embodiments, any or all of thumbnails 603-611 may be webpages from the history of the browsing session, bookmarks, most visited sites, or currently open tabs. In particular embodiments, each portion of display 602 is independently scrollable, as indicated by arrows 612. In browsers that do not utilize the aforementioned browser tab structure, or when a user selects a bookmark whose tab has been deleted due to age, each thumbnail image 603-611 may contain a button 613, that, when selected, navigates to the website corresponding to the particular thumbnail in a new browser tab or window. For example, if a user clicks or taps button 613 on the lower portion of thumbnail 605, browser 132 automatically opens a new tab and navigates to the address associated with thumbnail 605. This disclosure contemplates any manner of selecting or displaying thumbnail images 603-611.

Figure 7:
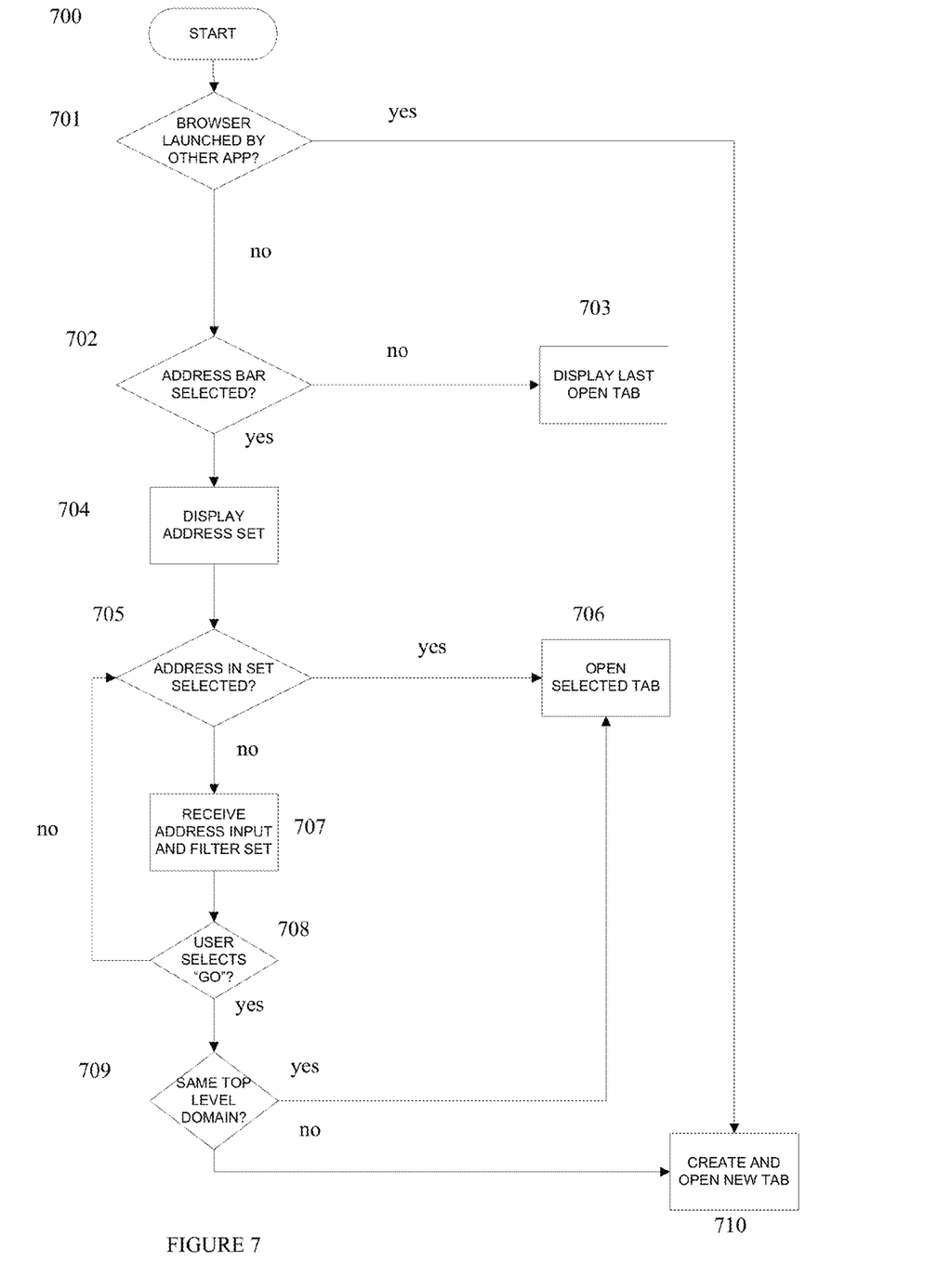
FIG. 7 is a flowchart illustrating an example method of displaying, creating, and managing browser tabs.

FIG. 7 illustrates an example method for operating a web browser 132 utilizing both the browser tab structure as described above, as well as the browser user interface. The process begins at Step 700, when the browser application begins.

At Step 701, browser 132 determines whether it was launched by another application, or by the user directly selecting the browser application. For example, browser 132 may be invoked by clicking a link in an email or instant message. As another example, browser 132 may be invoked by clicking on a place page in map, review, or social networking application. If browser 132 is invoked by clicking a link in another application, the process proceeds to Step 710, and browser 132 opens the link in a new tab. Thus, browser 132 creates an entry for the tab in table 300.

If the browser process was not invoked by another application, the process proceeds to Step 702. If the user does not select the address bar, web browser 132 proceeds to Step 703, where the most recently open tab is displayed.

If the user selects the address bar, in Step 704 mobile browser 132 displays a set of addresses to the user, as described with reference to FIGS. 5 and 6. As previously stated, the set of addresses may be displayed as a list or a set of thumbnail images. In particular embodiments, the set of addresses comprises the set of tabs in table 300. In particular embodiments, the tabs are organized chronologically. In particular embodiments, the tabs are frequency sorted, with the most-visited tabs displayed first.

After web browser 132 displays the set of addresses, it awaits user input at Step 705. If the user selects one of the addresses displayed in the set of addresses, at Step 706, browser 132 opens the tab associated with the address, and displays the website associated with the tab.

If the user does not select one of the displayed set of tabs, he or she generally begins typing in the desired web address into the address bar. At Step 707, web browser receives the first input character, and filters the address set by the character. At Step 708, if the user has not pushed the "go" or "navigate" button, the process of receiving an alphanumeric input and filtering the set of addresses repeats.

If the user types in the entire web address without selecting one of the tabs displayed in the filtered list and eventually selects the "go" or "navigate" button at Step 708, mobile browser 132 determines whether a tab exists in table 300 with the same top level domain. If there is a tab with the same top level domain, browser 132 at Step 706 opens the tab and navigates to the requested URL, thereby replacing the "most recently visited," or "tab state" of the tab with the requested URL.

If, at Step 709, browser 132 determines that no tab exists in table 300 with the same top-level domain as the requested URL, it proceeds to Step 710. At Step 710, web browser 132 creates a new entry in table 300 for the domain and navigates to the requested page.

The act of browsing and clicking through to links is exactly the same as beginning the process at Step 709, with the selected link as the requested URL. For example, when a user is on www.yelp.com and clicks a link to www.subway.com, browser 132 determines whether the requested link shares the top level domain with any tab in table 300, and if so, opens the tab and navigates to the requested URL, or, if not, creates a new tab and navigates to the URL.

It should be apparent from the preceding process flow that tabbed browsing, particularly on mobile browsers, is greatly simplified. The number of user selections or key presses required is drastically reduced. For example, if a user wishes to switch between two open tabs, an action that requires a minimum of four user selections in the prior art, only two selections are generally required; i.e., the user only needs to select the address bar, and then select the desired tab from the set of addresses (an open tab will be necessarily high in the browsing history). As another example, if a user wishes to open a new tab for one of his or her bookmarks, only two user selections are required; i.e., selecting the address bar, and selecting one of his or her bookmarks from the address set (as depicted in FIG. 6). Finally, as the most common use-case, in the prior art, opening a new tab for a unbookmarked, previously-unvisited site, would require at least a menu selection, a windows selection, a "new window" selection, typing in the URL, and selecting "go." In the graphical user interface of the present invention, the first three steps are bypassed; a new tab is created merely by the user punching in the address and pressing "go."

The tab structure of the present invention permits users to quickly switch between an infinite number of browser tabs, without having to manually manage tab creation and deletion. For example, if a user of the prior art browsers clicks a link on www.facebook.com that takes him to a separate domain, for example, an article, and wishes to return to facebook.com, he or she must click the back button roughly once for each link navigated to on the external domain. However, if he or she wishes to return to the external domain after visiting more links on the facebook domain, he must find her way back to the original link (the user cannot simply press the "forward" key). However, in the present invention, returning to each domain, each with its own separate browsing history, only requires two key presses. Thus the user may rapidly switch between tabs, even though the user did not "plan ahead" by opening two different tabs in preparation for switching between multiple domains. The arduous and time-consuming process of tab management is completely hidden from the user, providing a fast and seamless browsing experience.

Figure 8:
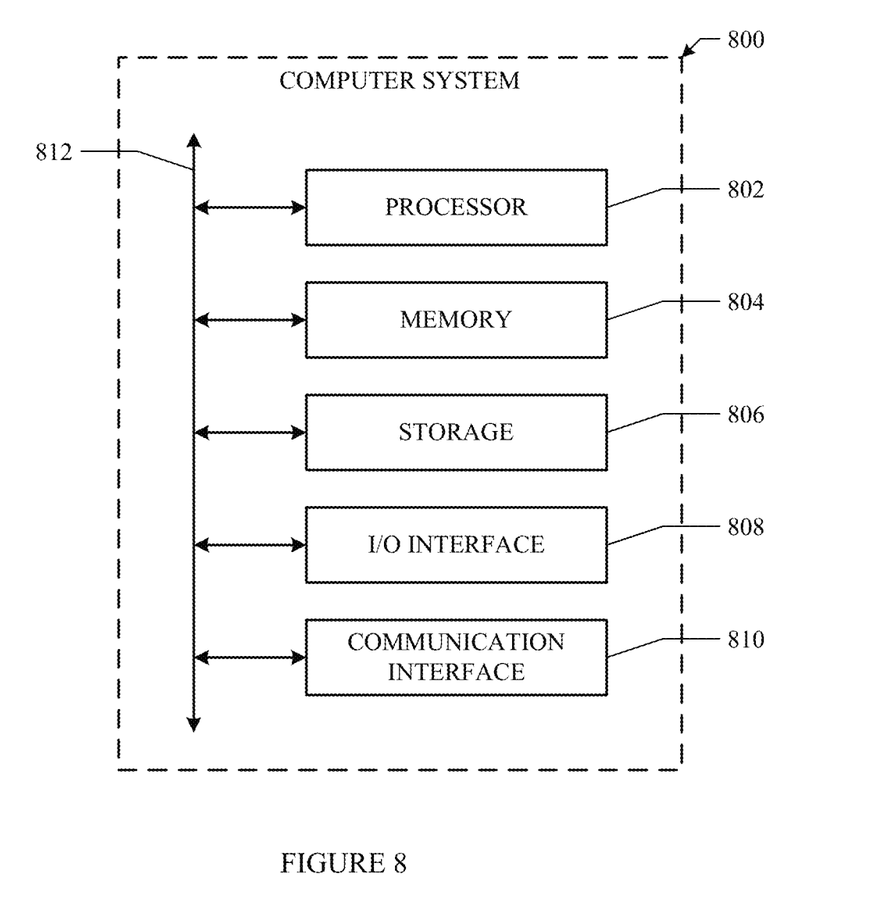
FIG. 8 illustrates an example computing system.

FIG. 8 illustrates an example computer system 800, which may be used with some embodiments of the present invention. This disclosure contemplates any suitable number of computer systems 800. This disclosure contemplates computer system 800 taking any suitable physical form. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein.

In particular embodiments, computer system 800 includes a processor 802, memory 804, storage 801, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 801 or another source (such as, for example, another computer system 800) to memory 804. One or more memory buses (which may each include an address bus and a data bus) may couple processor 802 to memory 804. Bus 812 may include one or more memory buses, as described below. Although this disclosure describes and illustrates particular memory, this disclosure contemplates any suitable memory.

In particular embodiments, storage 801 includes mass storage for data or instructions. Storage 801 may be internal or external to computer system 800, where appropriate. This disclosure contemplates mass storage 801 taking any suitable physical form. Where appropriate, storage 801 may include one or more storages 801. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. One or more of these I/O devices may enable communication between a person and computer system 800. This disclosure contemplates any suitable I/O devices and any suitable I/O interfaces 808 for them. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. This disclosure contemplates any suitable network and any suitable communication interface 810 for it. Although this disclosure describes and illustrates a particular communication interface, this disclosure contemplates any suitable communication interface.

In particular embodiments, bus 812 includes hardware, software, or both coupling components of computer system 800 to each other. Although this disclosure describes and illustrates a particular bus, this disclosure contemplates any suitable bus or interconnect.

The client-side functionality described above can be implemented as a series of instructions stored on a computer-readable storage medium that, when executed, cause a programmable processor to implement the operations described above.

Figure 9:
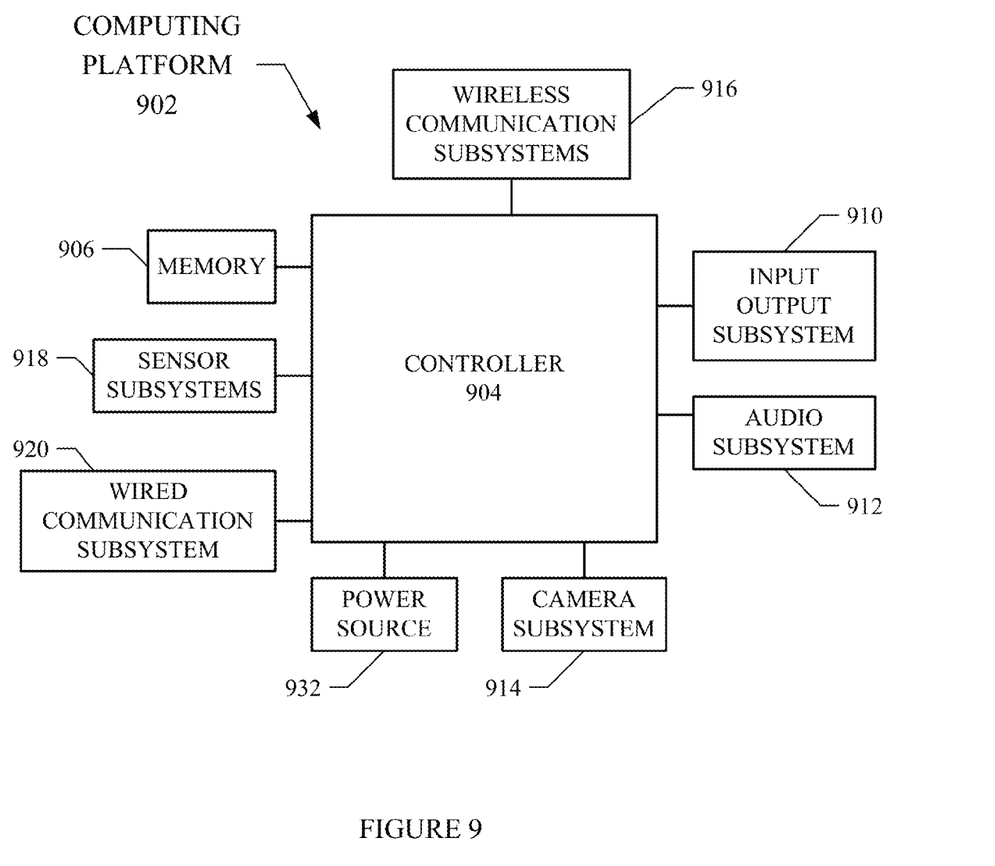
FIG. 9 illustrates an example mobile device.

While mobile device 130 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 908 described below) and/or data may be physically stored within a memory block 901 that is operatively coupled to controller 904.

Memory block 901 encompasses one or more storage media and generally provides a place to store computer code (e.g., software and/or firmware) and data that are used by the computing platform 902. By way of example, any of a number of suitable memory cards may be loaded into computing platform 902 on a temporary or permanent basis.

Controller 904 is also generally coupled to a variety of interfaces such as graphics control, video interface, input interface, output interface, and storage interface, and network interface, and these interfaces in turn are coupled to the appropriate devices. In certain embodiments, Controller 904 may connected to an input structure 914 and display 911 may be provided together, such an in the case of a touchscreen where a touch sensitive mechanism is provided in conjunction with the display 911.

Electric signals (e.g., analog) may be produced by microphone 910 and fed to earpiece 912. Controller 904 may receive instruction signals from input structure 914 and control the operation of display 911. Audio signals may be transmitted and received by means of an antenna 918 that may be connected through a radio interface 920 or audio input interface such as microphone 924 to codec 922 configured to process signals under control of controller 904. Additionally, multipoint sensing devices may be powered power source 932.

Mobile device may also include one or more user input devices 934 (other than input structure 914) that are operatively coupled to the controller 904. Generally, input devices 934 are configured to transfer data, commands and responses from the outside world into multipoint sensing devices.

Display device 911 is generally configured to display a graphical user interface (GUI) that provides an easy to use visual interface between a user of the computing platform 902 and the operating system or application(s) running on the mobile device.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more computing systems:
   receiving a command from a user to navigate to a first URL;
   searching a table of entries for a matching entry, the matching entry comprising a different URL having a domain matching a domain of the first URL, wherein the different URL is open in an open browser tab for the user;
   in response to finding the matching entry, displaying a web page for the first URL in the browser tab and updating the matching entry;
   in response to not finding the matching entry, creating a new browser tab associated with the domain of the first URL, and displaying a web page for the first URL in the new browser tab.

2. The method of claim 1, each entry associated with a domain, and comprising:
   a date and time of a last visit to its associated domain;
   a screenshot of a last-visited URL in its associated domain;
   forward and reverse history for its associated domain; and
   any cookies or form data for its associated domain.

3. The method of claim 2, updating the matching entry comprising:
   replacing the date and time of the last visit to a current date and time;
   replacing the screenshot with a screenshot of the first URL;
   adding the first URL to the history for the matching entry; and
   updating any cookies or form data.

4. The method of claim 1, further comprising, in response to not finding the matching entry, adding a new entry associated with the domain of the first URL to the table of entries.

5. The method of claim 1, wherein the command is received from the user via a separate application.

6. The method of claim 1, wherein the command contains an explicit instruction to create a new browser tab.

7. A non-transitory, computer-readable media comprising instructions operable, when executed by one or more computing systems, to:
   receive a command from a user to navigate to a first URL;
   search a table of entries for a matching entry, the matching entry comprising a different URL having a domain matching a domain of the first URL, wherein the different URL is open in an open browser tab for the user;
   in response to finding the matching entry, display a web page for the first URL in the browser tab and update the matching entry;
   in response to not finding the matching entry, create a new browser tab associated with the domain of the first URL, and display a web page for the first URL in the new browser tab.

8. The media of claim 7, wherein each entry is associated with a domain, and comprises:
   a date and time of a last visit to its associated domain;
   a screenshot of a last-visited URL in its associated domain;
   forward and reverse history for its associated domain; and
   any cookies or form data for its associated domain.

9. The media of claim 8, updating the matching entry comprising:
   replacing the date and time of the last visit to a current date and time;
   replacing the screenshot with a screenshot of the first URL;
   adding the first URL to the history for the matching entry; and
   updating any cookies or form data.

10. The media of claim 7, the instructions further operable when executed to, in response to not finding the matching entry, add a new entry associated with the domain of the first URL to the table of entries.

11. The media of claim 7, wherein the command is received from the user via a separate application.

12. The media of claim 7, wherein the command contains an explicit instruction to create a new browser tab.

13. A system comprising:
   one or more processors; and
   a memory coupled to the processors comprising instructions executable by the processors, the processors being operable when executing the instructions to:
      receive a command from a user to navigate to a first URL;
      search a table of entries for a matching entry, the matching entry comprising a different URL having a domain matching a domain of the first URL, wherein the different URL is open in an open browser tab for the user;

in response to finding the matching entry, display a web page for the first URL in the browser tab and update the matching entry;

in response to not finding the matching entry, create a new browser tab associated with the domain of the first URL, and display a web page for the first URL in the new browser tab.

14. The system of claim 13, wherein each entry in the table of entries is associated with a domain and comprises:

a date and time of a last visit to its associated domain;

a screenshot of a last-visited URL in its associated domain;

forward and reverse history for its associated domain; and any cookies or form data for its associated domain.

15. The system of claim 14, updating the matching entry comprising:

replacing the date and time of the last visit to a current date and time;

replacing the screenshot with a screenshot of the first URL;

adding the first URL to the history for the matching entry; and updating any cookies or form data.

16. The system of claim 13, wherein the processors are further operable when executing the instructions to, in response to not finding the matching entry, add a new entry associated with the domain of the first URL to the table of entries.

17. The system of claim 13, wherein the command is received from the user via a separate application.

18. The system of claim 13, wherein the command contains an explicit instruction to create a new browser tab.

* * * * *